(12) United States Patent
Connell et al.

(10) Patent No.: US 9,072,213 B2
(45) Date of Patent: Jul. 7, 2015

(54) IMPLEMENT FRAME TUBE JOINT WITH WELDABLE CONNECTOR

(75) Inventors: Richard Joseph Connell, Slater, IA (US); Shawn Jeremy Becker, Ankeny, IA (US); Garrett Lee Goins, Ankeny, IA (US); Jarrod Ray Ruckle, Bondurant, IA (US); Mark Eugene Barker, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 958 days.

(21) Appl. No.: 12/833,801

(22) Filed: Jul. 9, 2010

(65) Prior Publication Data

US 2010/0310308 A1    Dec. 9, 2010

Related U.S. Application Data

(62) Division of application No. 11/409,295, filed on Apr. 21, 2006, now Pat. No. 7,766,576.

(51) Int. Cl.
*F16B 7/08* (2006.01)
*A01B 51/00* (2006.01)
*B23K 31/02* (2006.01)

(52) U.S. Cl.
CPC ........... *A01B 51/00* (2013.01); *Y10T 403/7188* (2015.01); *Y10T 403/39* (2015.01); *Y10T 403/7001* (2015.01); *Y10T 403/7194* (2015.01); *B23K 31/02* (2013.01); *B23K 2201/06* (2013.01)

(58) Field of Classification Search
USPC .................................................. 403/186–192
See application file for complete search history.

(56) References Cited

U.S. PATENT DOCUMENTS

| 381,137 | A | | 4/1888 | Hodges |
|---|---|---|---|---|
| 1,815,598 | A | | 7/1931 | Stroup |
| 1,848,085 | A | | 3/1932 | Eisenschmidt |
| 1,908,821 | A | | 5/1933 | Cornell, Jr. |
| 1,931,101 | A | | 10/1933 | Beckstrom |
| 2,101,317 | A | | 12/1937 | Lemieux |
| 2,126,519 | A | | 8/1938 | Vogel |
| 2,152,891 | A | | 4/1939 | Köhnke |
| 2,217,055 | A | | 10/1940 | Jennens |
| 2,610,460 | A | | 9/1952 | Hendrickson |
| 3,415,554 | A | | 12/1968 | Papayoti |
| 3,512,811 | A | | 5/1970 | Bardgette et al. |
| 3,688,550 | A | | 9/1972 | Stanley |
| 4,660,345 | A | * | 4/1987 | Browning ................ 52/653.2 |
| 4,677,805 | A | | 7/1987 | Schleisner |
| 5,224,320 | A | | 7/1993 | Mai |
| 5,429,423 | A | | 7/1995 | Pollock et al. |
| 5,707,170 | A | | 1/1998 | Wattonville |

(Continued)

FOREIGN PATENT DOCUMENTS

DE    19538459 A1    10/1995
WO    03045765 A1    6/2003

*Primary Examiner* — Victor MacArthur

(57) ABSTRACT

A tube over tube joint for an implement frame includes a self-fixturing weldable connector positioned between upper and lower tubes. Standard fillet welds connect the tubes to the connector. A unitary casting can be used made from material selected to optimize load transfer between the top and bottom tubes to improve the fatigue life of the joint. The casting is self-fixturing so the top tubes can be located by simply placing in the casting on the lower tubes. A tube end connector provides fixturing and weld surfaces for butt joints in planar frames. Outwardly extended weld edges on the connector increase resistance to parallelogramming of the frame.

3 Claims, 6 Drawing Sheets

(56) References Cited

U.S. PATENT DOCUMENTS

| | | | |
|---|---|---|---|
| 5,715,643 A * | 2/1998 | Parkinson | 52/656.9 |
| 5,762,436 A | 6/1998 | Mosdal | |
| 5,785,460 A | 7/1998 | Noonan et al. | |
| 5,791,743 A | 8/1998 | Sitter et al. | |
| 6,016,877 A | 1/2000 | Noonan et al. | |
| 6,106,217 A | 8/2000 | Knell | |
| 6,402,414 B1 | 6/2002 | Kanodia et al. | |
| 6,412,857 B2 | 7/2002 | Jaekel et al. | |
| 6,732,812 B1 | 5/2004 | Royer | |
| 6,851,886 B2 | 2/2005 | Anderson | |
| 2001/0000119 A1 | 4/2001 | Jaekel et al. | |

* cited by examiner

IMPLEMENT FRAME TUBE JOINT WITH WELDABLE CONNECTOR

This application is a division of applicants' commonly assigned application U.S. Ser. No. 11/409,295, filed 21 Apr. 2006 entitled IMPLEMENT FRAME TUBE JOINT WITH WELDABLE CONNECTOR, now U.S. Pat. No. 7,766,576.

FIELD OF THE INVENTION

The present invention relates generally to agricultural implement frames and, more specifically to tube joints for such frames.

BACKGROUND OF THE INVENTION

Many agricultural implement frames include tubular members welded or connected together by brackets. The joints are subjected to very high loads and stresses.

Tube over tube connections for an implement frame construction typically employ one of two methods of construction. The first method includes welding the top and bottom tubes directly together using flare bevel welds. The direct weld procedure requires joint welds in hard to reach positions. If welds are required around tube corners, robotic welding techniques often are not used since programming the robot to closely follow the corners is not always possible. Fatigue and less than optimum load transfer characteristics of some joints can result in a weakened frame. The second method of frame construction uses gusset plates vertically extending between the top and bottom tubes and welded to the tubes. The weld positioning is better using the gusset method than the direct tube to tube weld method, but gusset weld methods often result in a joint with a lower fatigue life compared to other types of joints.

A further method involves tube through tube construction such as shown and described in commonly assigned U.S. Pat. No. 6,016,877. Such construction provides excellent frame tube joints and a very strong overall frame without need for extensive fixturing during manufacture, but such joints require laser cut apertures through tubes and are relatively expensive to produce. In addition, welding tube ends to adjoining tubes in the same plane continues to be a source of difficulty.

SUMMARY OF THE INVENTION

It is therefore an object of the invention to provide an improved frame joint for an agricultural implement frame. It is another object to provide such a joint that overcomes most or all of the aforementioned problems.

It is a further object of the invention to provide an improved welded frame joint for an implement which is stronger, subject to less fatigue, and easier to manufacture than at least most previously available implement frame joints. It is another object to provide such a joint which is self-fixturing and is easily weldable using standard fillet welds at conveniently accessed locations.

Tube over tube implement frame joints include self-fixturing weldable castings positioned between upper and lower tubes. Standard fillet welds connect the tubes to the casting at conveniently accessible locations. The material in the casting is selected to optimize load transfer between the top and bottom tubes to improve the fatigue life of the joint. The weldable casting can be placed at any required joint area and provides an easy weld joint for both human and robotic welders. Since the casting is self fixturing, the top tubes can be located by simply placing in the casting without need for costly fixtures. In another embodiment of the invention, castings are provided at the ends of tubes to facilitate butt joint fixturing and welding for connecting tubes lying in the same plane. The above-described connections spread the weld locations for increased resistance to parallelogramming and better load balancing at the joints. The connections also provide added strength and fatigue resistance at tube joints adjacent hinge locations.

These and other objects, features and advantages of the present invention will become apparent from the description below taken in view of the drawings.

DESCRIPTION OF THE PREFERRED EMBODIMENT

Figure 1:
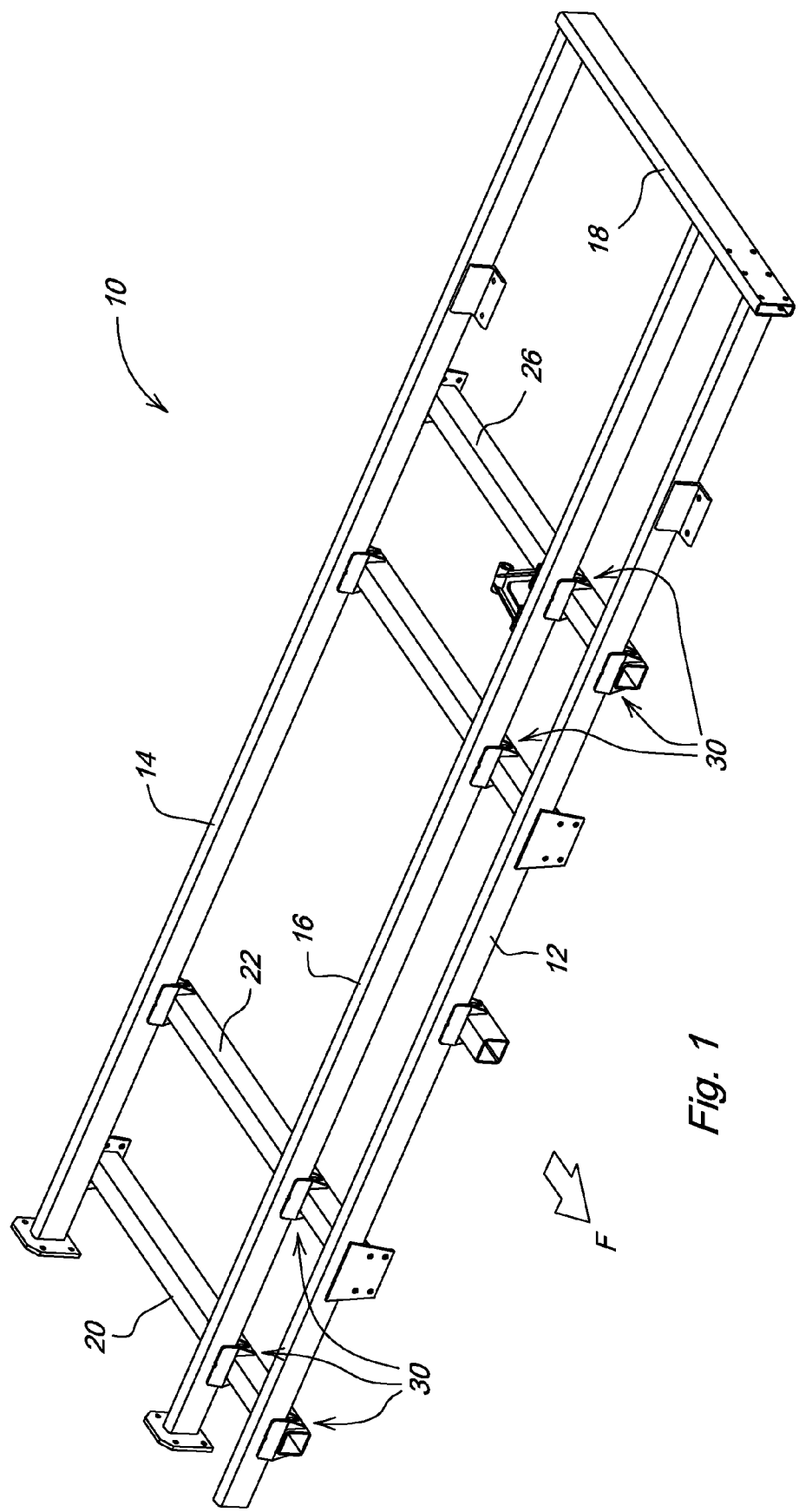
FIG. 1 is a perspective view of a portion of an agricultural implement frame.

Referring to FIG. 1, therein is shown an implement frame 10 having transversely extending tubular beam or frame tubes 12, 14 and 16 connected to fore-and-aft extending tubular beam or frame tubes 18, 20, 22, 24 and 26. The beams are rectangular in cross-section with rounded corners, and a beam over beam construction is utilized to connect the tubes 12, 14 and 16 to the beams 20, 22, 24 and 26 to provide a main frame of generally rectangular configuration. The right ends (as viewed in FIG. 1) of the beams 12-16 are connected to the inside face of the fore-and-aft beam 18. For purposes of the description, the beams 20-26 are designated as lower or first beams and the beams 12-16 are designated as upper or second beams, but it is to be understood that the positions can be reversed or otherwise changed and that the upper and lower designations are for providing a reference for clarity in the description of the drawings. Earthworking or seeding tools and hitch structure (not shown) for towing the frame forwardly (F) through a field with the tools engaging the soil. The heavy loads encountered by the implement frame 10 during transport and field-working operations require strong connections at the beam joints.

Figure 2:
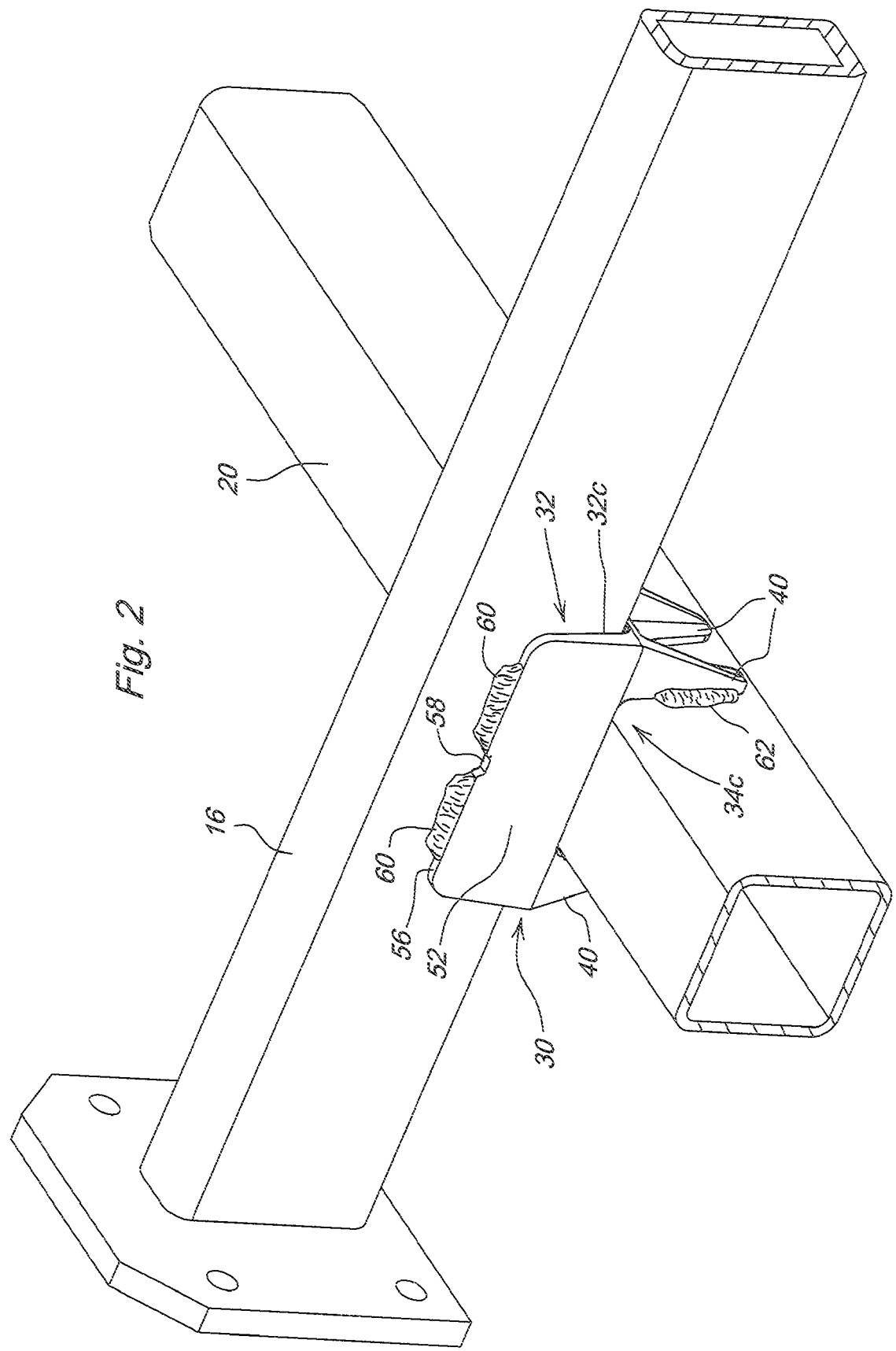
FIG. 2 is an enlarged perspective view of a frame joint for the frame of FIG. 1.
Figure 3:
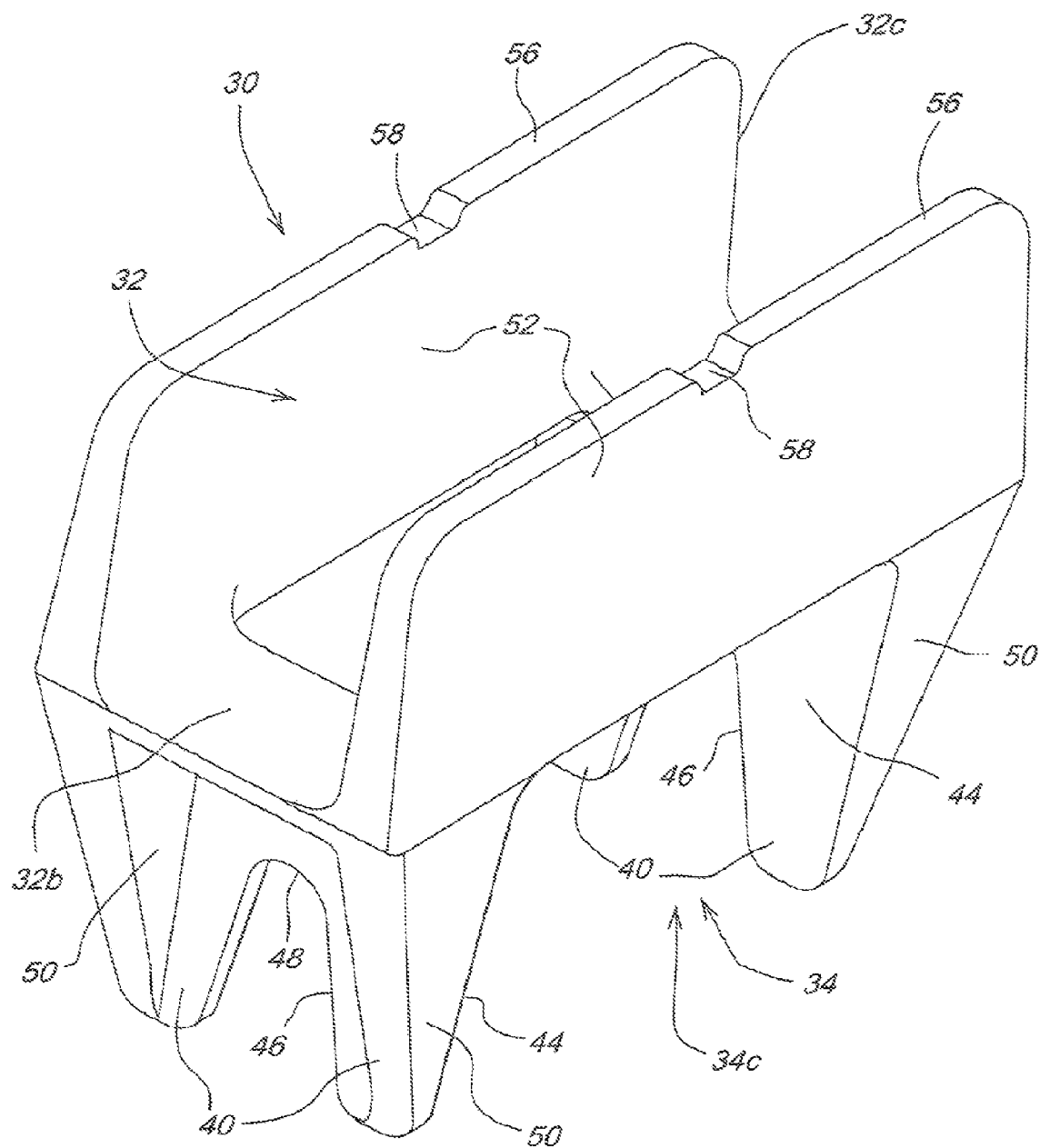
FIG. 3 is a perspective view of a connector utilized with the frame joint of FIG. 2.

To provide self-fixturing and a strong, permanent connection between the upper and lower beams, a weldable connector or casting 30 is positioned at joint locations. The casting 30 as shown in FIGS. 2 and 3 includes an upwardly directed channel or saddle portion 32 (FIG. 3) and a downwardly opening channel or saddle portion 34. For a right-angle joint as shown in the figures, the saddle portion 32 includes a channel 32c conforming generally to the shape of the upper beam 16 (FIG. 2) and a channel 34c conforming generally to the shape of the lower beam 20 and perpendicular to the channel 32c. The connector 30 can be fixed to one of the beams and functions as a fixture to locate the other of the beams. The channel configurations thus provide easy and reliable set up of the frame components without need for additional fixturing.

As best seen in FIGS. 2 and 3, the connector 30 includes opposite pairs of bifurcated flanged or leg portions 40 having generally planar inside surfaces 44 defining the channel 34c. Slots 46 with arc-shaped top portions 48 separate the leg portions 40, and tapered flanges 50 project outwardly from the channel 34c. The leg portions 40 extend upwardly to a connection with bottom 32b (FIG. 3) of the saddle portion 32. The bottom 32b is generally open between the opposite leg portions 40.

Planar channel walls 52 extend upwardly from the bottom 32b to define the channel portion 32c. The walls 52 include uppermost edges 56 having a height approximately half the dimension of the corresponding wall of the beam 16. A notch 58 is centrally located in each uppermost edge and provides a paint drainage channel. The connector 30 is fixed to the upper beam 16 or first frame tube by welds at locations 60 between the corners of the beam. The first frame tube is welded at the central locations to the uppermost edges so that the first frame tube is substantially devoid of welds adjacent corners of the tube. The leg portions 40 are welded to the corresponding walls of the beam 20 at locations 62 also offset from the beam corners.

Figure 4:
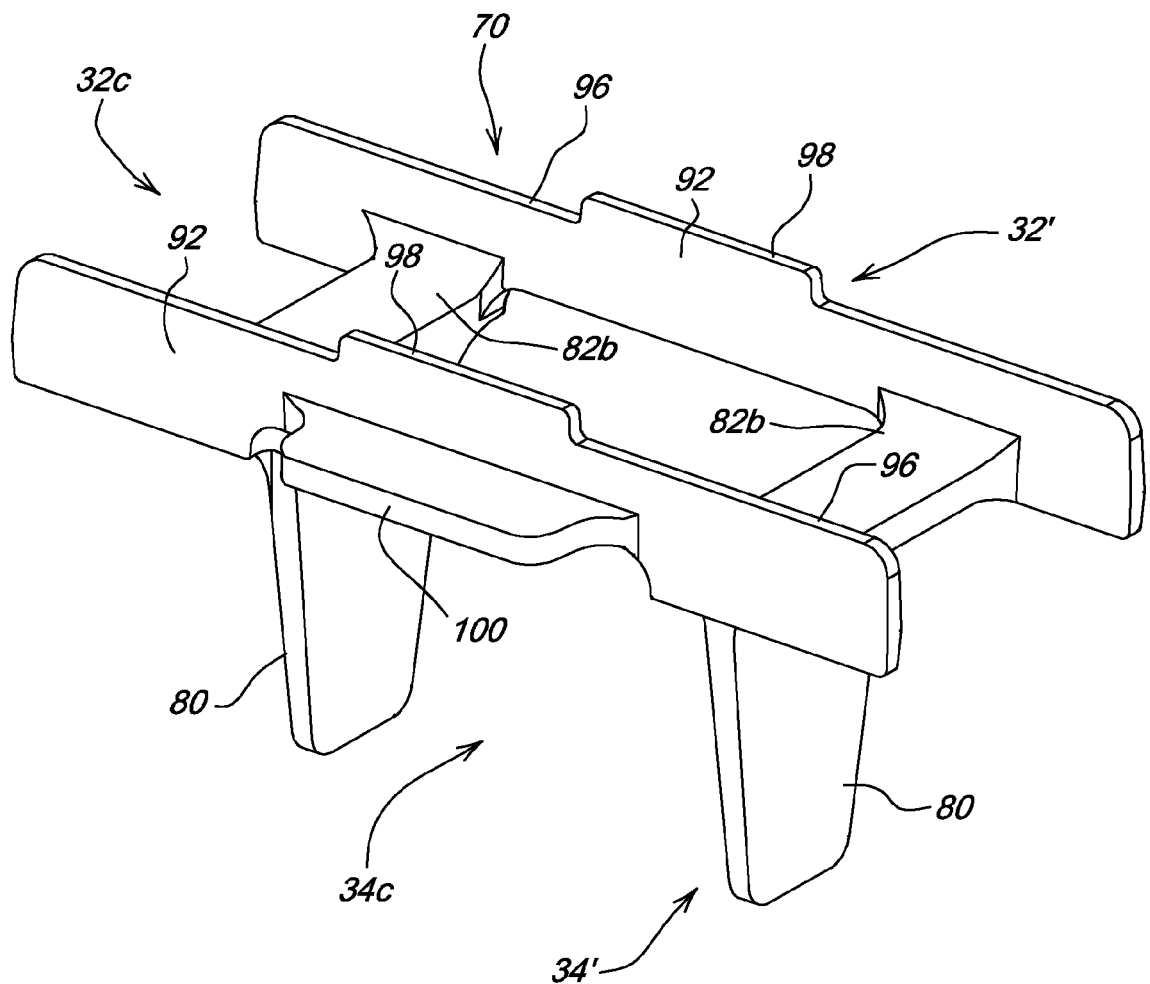
FIG. 4 is a perspective view of another embodiment of a connector utilized for a tube over tube construction.
Figure 5:
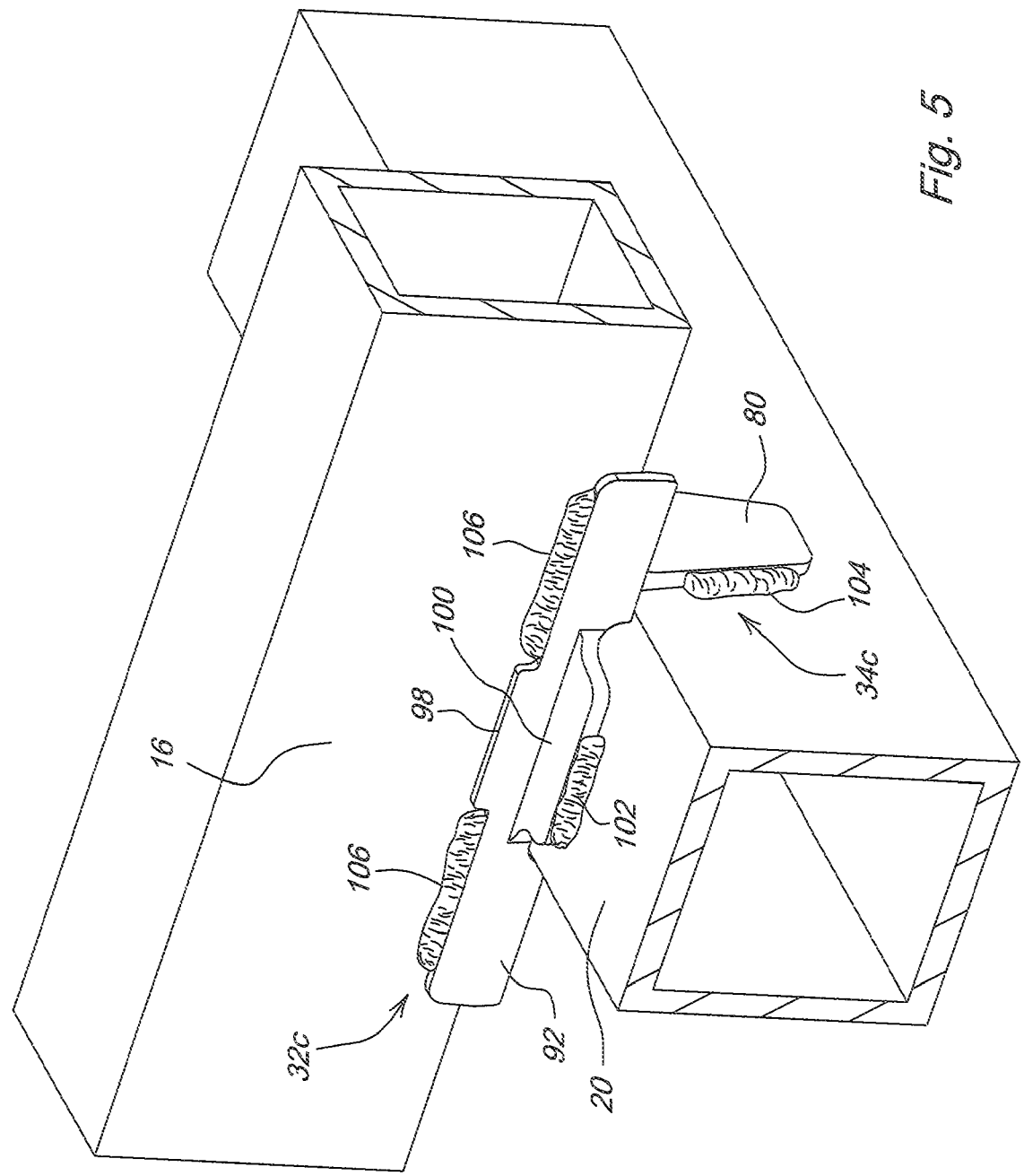
FIG. 5 is a perspective view of the connector of FIG. 4 welded to frame tube.

In an alternate embodiment (FIGS. 4 and 5), a connector 70 includes opposite leg portions 80 which are generally planar and define the channel 34c of saddle portion 34'. The leg portions 80 extend upwardly to a connection with bottom 82b of saddle portion 32'. The bottom 82b is open between the leg portions 80 and connects to planar channel side walls 92 having top edges 96 with a central raised edge portion 98. A side extension 100 is located outwardly of each of the side walls 92 and provides a conveniently located edge for connecting the extension to the top surface of the tube 20 (FIG. 5) at weld location 102. The opposite edges of the leg portions 80 are welded at 104 to the side walls of the tube 20. The welds 104 are offset from the tube corners. The edges 96 are welded at locations 106 to the upright side walls of the tube 16. The extension 100 provides a central weld location relative to the adjoining beam 20 and provides good distribution of stress at the joint. By spreading out the weld locations with the connectors as shown, resistance to parallelogramming is increased and stresses on the tubes are reduced. The joint is thus strengthened, and problems of in-plane shearing caused by frame parallelogramming are reduced or eliminated. The raised portion 98 does not require welding and provides a locator for the innermost portions the welds 106.

Figure 6:
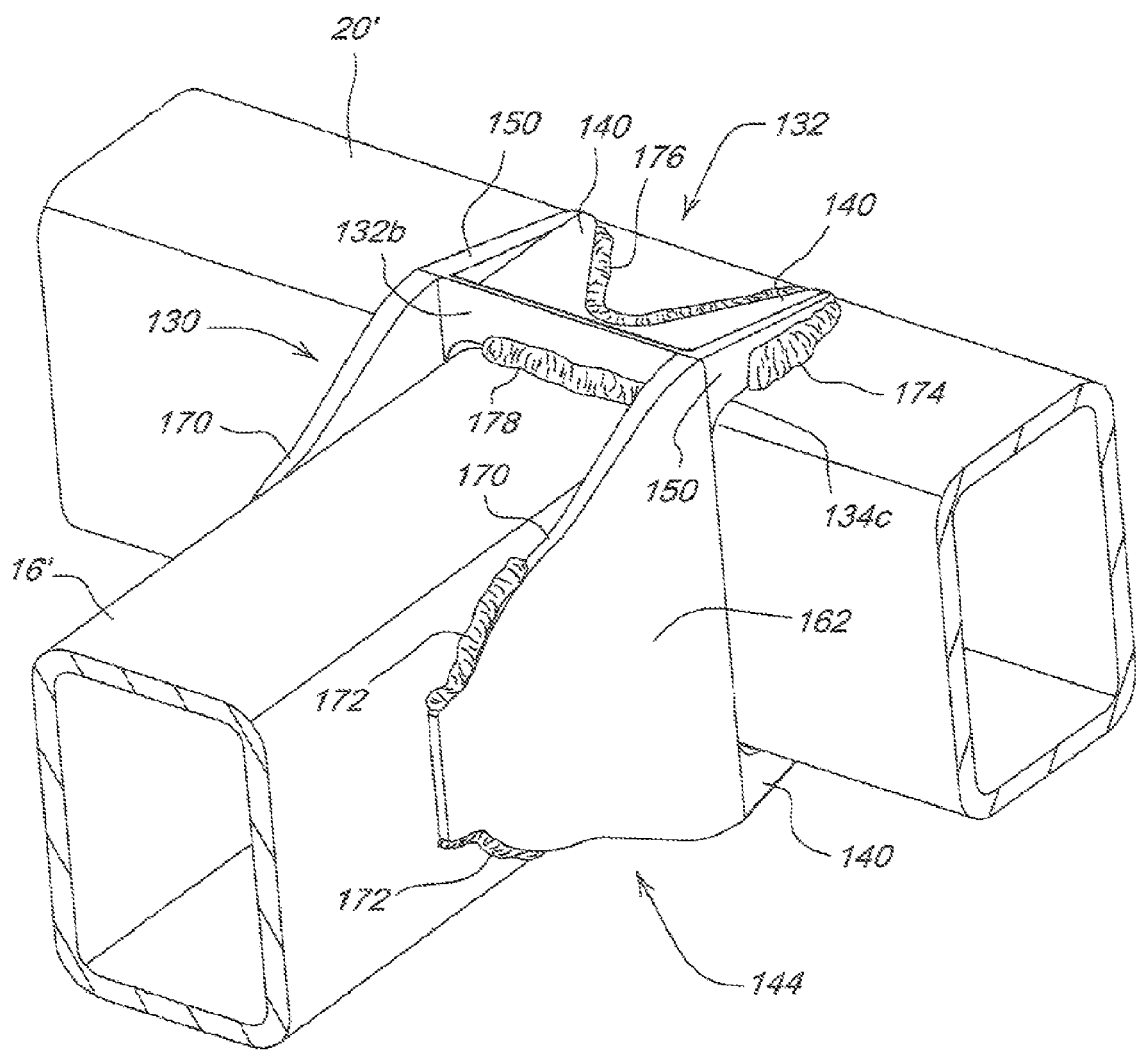
FIG. 6 is a perspective view of a frame butt joint for connecting a tube end to an adjoining tube in generally the same plane.

To provide butt joints for a planar frame configuration (FIG. 6), a weldable connector 130 includes a saddle portion 132 opening towards a first beam or tube 20'. The saddle portion 132 includes upper and lower pairs of leg portions 140, each leg portion 140 including a tapered flange 150 disposed perpendicular to an adjacent upper or lower side wall of the tube 20' and, thus, being similar in construction to the leg portions 40 described above for FIGS. 2 and 3 and defining a channel 134c for receipt on the tube 20'. A saddle portion 144 conforms to the cut end of a second tube 16' and includes planar channel walls 162 with curved edges 170 which are welded at locations 172 to opposite side walls of the tube 16'. The welds at 172 are offset inwardly from the corners of the tube 16'. Welds 174 and 176 connect the leg portions 140 to the walls of the tube 20' inwardly of the adjacent corners of the tube. Welds 178 secure opposite upper and lower walls of the tube 16' to upper and lower upright flanges 132b which extend between the channel walls' 162 at each of upper and lower regions adjacent the end of the tube 16'. A hinge receiving end 20h of the tube 20' can receive hinge structure. (not shown) for connecting one section of the implement frame to an adjoining section adjacent the connector 130. The above-described joint provides a strong and fatigue-resistant connection at the hinge area.

Having described the preferred embodiment, it will become apparent that various modifications can be made without departing from the scope of the invention as defined in the accompanying claims.

The invention claimed is:

1. An agricultural implement frame comprising:
a first frame tube;
a second frame tube;
the first and second frame tubes having side walls connected at tube corners by upper and lower walls;
a weldable connector having a first receiving area opening towards the first frame tube and conforming to the shape of the first frame tube, the connector including a second receiving area opening towards the second frame tube conforming to the shape of the second frame tube;
a first weld structure connecting at least one of the walls of the first frame tube to the connector adjacent the first receiving area;
a second weld structure connecting a central portion of the side walls of the second frame tube to the connector adjacent the second receiving area;
wherein the first frame tube and the second frame tube lie generally in the same plane, and the weldable connector is secured to an end of the second frame tube by the second weld structure at locations excluding corners of the second frame tube and locates the end relative to the first frame tube; and
wherein the first weld structure is centrally located between the tube corners of said first frame tube and offset from the tube corners of said first frame tube.

2. The implement as set forth in claim 1 wherein the second receiving structure comprises parallel planar walls respectively engaging the opposite side walls of the second frame tube, with each planar wall having upper and lower curved edges converging in a direction away from the end of the second frame tube, and with the second weld structure extending along a portion of each of the upper and lower curved edges.

3. The implement as set forth in claim 1 wherein the first receiving area includes upper and lower flanged legs respectively embracing upper and lower sides of said first frame tube, with each of said flanged legs including a pair of flanges respectively located at opposite sides of the leg and extending perpendicularly to the first frame tube, and said first weld structure connecting the pair of flanges of the upper flanged leg to the upper wall of the first frame tube and connecting the pair of flanges of the lower flanged leg to the lower wall of the first frame tube.

* * * * *